United States Patent
Robinson et al.

[11] Patent Number: 5,877,800
[45] Date of Patent: Mar. 2, 1999

[54] OPTICAL DATA RECORDING APPARATUS AND METHOD

[75] Inventors: Laurence John Robinson, Hertfordshire; Robert Martin Pettigrew, Cambridgeshire, both of Great Britain

[73] Assignee: Imperial Chemical Industries PLC, London, England

[21] Appl. No.: 602,780

[22] PCT Filed: Sep. 12, 1994

[86] PCT No.: PCT/GB94/01984

§ 371 Date: May 28, 1996

§ 102(e) Date: May 28, 1996

[87] PCT Pub. No.: WO95/07184

PCT Pub. Date: Mar. 16, 1995

[30] Foreign Application Priority Data

Sep. 10, 1993 [GB] United Kingdom .................. 9318804

[51] Int. Cl.⁶ .................................................. B41J 2/47
[52] U.S. Cl. ....................................... 347/255; 347/258
[58] Field of Search ................................. 347/239, 255, 347/135, 136, 259, 258, 256, 119, 224; 359/314, 305, 292, 237; 349/2, 3

[56] References Cited

U.S. PATENT DOCUMENTS

| | | | |
|---|---|---|---|
| 4,162,121 | 7/1979 | Starkweather et al. | 359/311 |
| 4,199,783 | 4/1980 | Huignard et al. | 347/239 X |
| 4,571,603 | 2/1986 | Hornbeck et al. | 347/239 |
| 4,804,977 | 2/1989 | Long | 347/239 |
| 5,049,901 | 9/1991 | Gelbart | 347/239 |
| 5,105,206 | 4/1992 | Sarraf et al. | 347/259 |
| 5,132,834 | 7/1992 | Shinada | 347/239 X |
| 5,260,799 | 11/1993 | Loce et al. | 347/119 X |
| 5,315,575 | 5/1994 | Akatsuka | 369/112 |

FOREIGN PATENT DOCUMENTS

| | | | |
|---|---|---|---|
| 0433985A2 | 6/1991 | European Pat. Off. | G03G 15/04 |
| 4252425 | 9/1992 | Japan | G11B 7/00 |
| WO91/10310 | 7/1991 | WIPO | H04N 1/032 |

*Primary Examiner*—David F. Yockey
*Attorney, Agent, or Firm*—Testa, Hurwitz & Thibeault, LLP

[57] ABSTRACT

A laser beam emitted from a stripe-shaped area of a laser diode is expanded in its low divergence axis to match a length of a modulator which individually modulates different regions of the beam to produce a plurality of individually modulated beam portions which are focused by a lens onto a recording medium, such as dye and receiver sheets, to effect data recording. The modulator may be a row of LCD cells, an acousto-optic modulator, or a row of micromirrors.

14 Claims, 3 Drawing Sheets

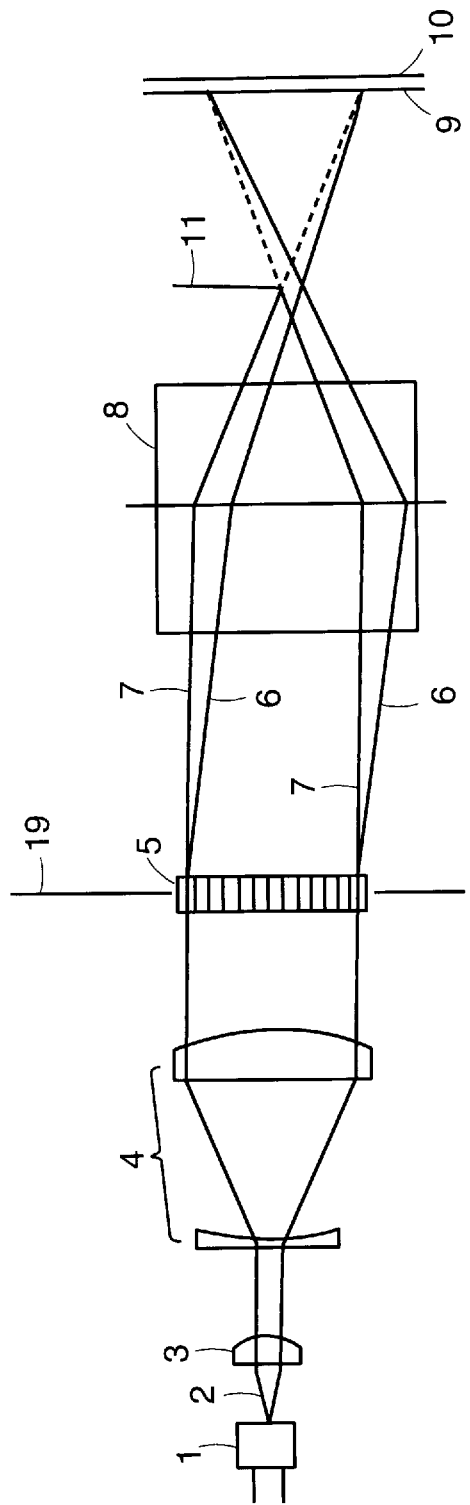
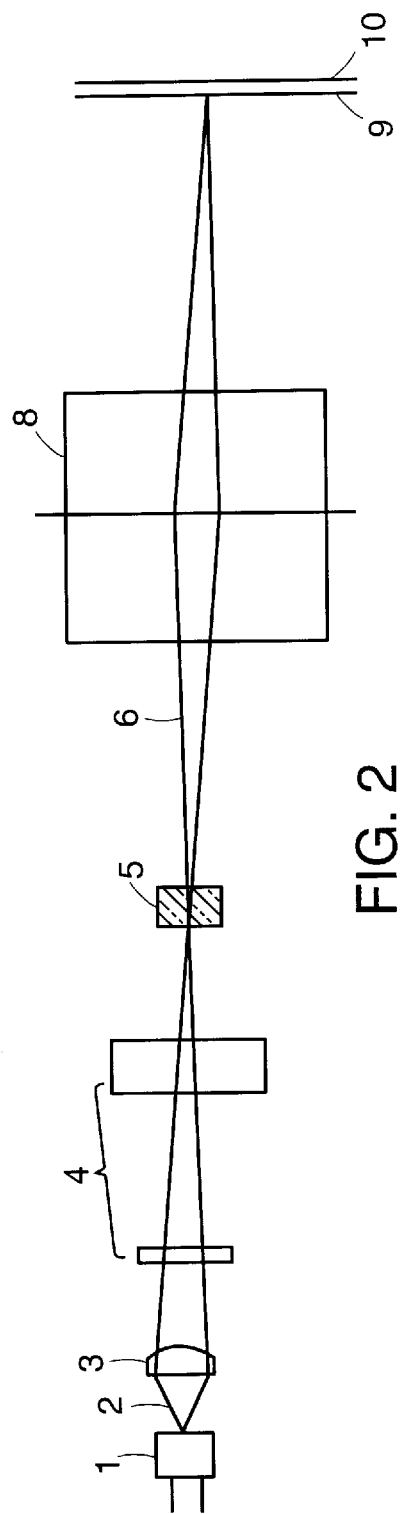

OPTICAL DATA RECORDING APPARATUS AND METHOD

TECHNICAL FIELD

The present invention relates to apparatus and methods for optical data recording, and relates particularly, though not exclusively, to dye thermal transfer printing.

BACKGROUND OF THE INVENTION

In dye thermal transfer printing, heat is applied to selected pixel areas of a dyesheet to cause dye to transfer from the heated areas to form printed pixels on an adjacent dye receiver sheet and thereby form a printed image.

Laser diodes are often chosen as the heat source, as they are inexpensive, reliable and compact. In typical printing apparatus, the output beam from a single laser diode is intensity modulated as it is scanned across the dyesheet, and each scan prints a line of pixels to the receiver sheet. The beam may be modulated merely on or off, so that a pixel is either printed or not, or the beam intensity may be varied over a range of values to vary the amount of dye transferred from a pixel area and provide pixels of varying tones to allow for continuous tone printing.

Laser diodes, however, typically emit light from an elongate stripe area, and so the beam quality is asymmetric, the output beam having a high divergence in the axis of the stripe's width and a low divergence in the axis of the stripe's length. A problem with laser diodes then is that, although the beam may be focused quite readily to a relatively high resolution in its high divergence axis, it is more difficult to do this in the low divergence axis, and so high overall resolution is difficult to achieve.

A further problem of the above apparatus is that the print speed is low, because each pixel must be individually printed in turn. Also, the beam-scanning optical assembly is complex and increases the costs and size of the apparatus, whilst reducing reliability.

One way of increasing print speed, and of simplifying the scanning assembly, is to arrange a plurality of laser diodes into an array, and to intensity modulate each laser diode individually while scanning the output beams together across the dyesheet. This then allows a plurality of pixel lines to be printed simultaneously. The use of a plurality of laser diodes, however, itself, adds to the expense and complexity of the apparatus.

SUMMARY OF THE INVENTION

From a first aspect, the present invention provides data recording apparatus comprising a laser diode which, in use, emits a light beam from an elongate stripe area, modulator means arranged in one dimension only parallel to the low divergence axis of the beam and operable to individually modulate different regions of the beam cross-section along said axis to produce a plurality of individually modulated beam portions, and means for focusing the beam portions onto a recording medium to effect data recording.

From a further aspect the invention provides a data recording method which comprises modulating in one dimension the light beam from a laser diode, which dimension is parallel to the low divergence axis of the beam, such that different cross-sectional regions of the beam along said axis are individually modulated to provide respective beam portions which are focused onto a recording medium.

The invention is preferably for use in dye thermal transfer printing, in which case the recording medium may be a pair of adjacent dye donor and receiver elements. Other applications, however, may be envisaged, such as the etching of pits or the reorientation of regions of a magnetic material, as data, in suitable recording media.

By spatially splitting the main beam into an array of separate beam portions along the low divergence axis (i.e. the axis which is parallel to the long dimension of the laser diode emitting stripe), the problems of resolution in that axis are reduced, as each separate beam portion can be focused to a separate pixel area. Better resolution can therefore be achieved in the low divergence axis, which, if desired, can be set to match the resolution in the high divergence axis, along which the beam is not divided.

Further, the separate beam portions can print a plurality of pixels simultaneously, thereby increasing print speed and reducing or avoiding the need for large beam-scanning optical assemblies, without requiring the use of a plurality of separate laser diodes.

The modulator means may take any suitable form, and, for example, may comprise an LCD array consisting of a single row of LCD cells extending across the low divergence axis of the laser beam, each cell being individually switchable to modulate the intensity of the region of the laser beam which falls on it, so that each cell produces a separate individually modulated beam portion.

In a preferred embodiment, however, the modulator means comprises an acousto-optic modulator extending across the low divergence axis of the laser beam, means being provided to produce an acoustic wave train in the modulator, with regions of the wave train acting as diffraction gratings which each produce a deflected beam portion from a respective region of the laser diode beam cross-section as the beam passes through the modulator, the intensity of a deflected beam portion depending on the amplitude of the wave train region producing it.

The apparatus may be arranged such that the deflected beam portions are focused onto the recording medium, and the portions of the beam which are undeflected are blocked off by suitable means. Alternatively, means may be provided to block off the deflected beam portions, and the apparatus may be arranged to focus the undeflected beam portions onto the recording medium. In this latter arrangement, however, it is difficult to linearly vary the intensity of the undeflected beam portions. Moreover, it is not possible to diffract all the light into a deflected beam portion. Therefore, it is not possible to completely turn off the undeflected beam portions. This may be undesirable, especially in continuous tone printing, and so focusing of the deflected rather than the undeflected beam portions is preferred.

An acousto-optic modulator has a number of advantages over an LCD array, in that it is less expensive, less complex and more reliable. Also, resolution, i.e. the pixel size, is determined by the lengths of the diffracting regions of the wave train (subject to any magnification/demagnification by the imaging means), which are readily and accurately controllable to enable higher resolutions to be achieved than with LCD arrays. Further, the resolution may be quickly and easily modified by suitably altering the acoustic wave, in contrast with LCD arrays which provide only a fixed resolution. Another advantage is that it is relatively easy to modulate the amplitude of an acoustic wave to produce beam portions of varying intensity, whilst it is more difficult and expensive to fabricate an LCD cell capable of accurately varying a beam's intensity over a range of values. Acousto-optic modulators also tend to provide better contrast than LCD arrays.

The acoustic waves applied to the acousto-optic modulator may be in any suitable form, and could, for example, comprise a plurality of wave pulses, each pulse having the same amplitude or a different amplitude from one another. Preferably however, the acoustic wave is in the form of an amplitude modulated carrier wave, as this provides an especially simple and responsive arrangement, and control means may be provided to apply a carrier wave to the acousto-optic modulator, and to amplitude modulate the carrier wave based on the data to be recorded. For example, if the deflected beams are focused onto a dyesheet, then a region of the carrier wave may be modulated with a high amplitude to print a dark pixel, with a lower amplitude to produce a lighter pixel, and with a very low or zero amplitude to prevent a pixel from being printed.

Whatever the nature of the acoustic wave, it is preferably of a frequency which produces optimal diffraction of the laser light.

As the acoustic wave is not stationary, but propagates through the modulator, means are preferably provided to pulse the laser diode beam for a time which is short compared with the propagation speed of the wave. This allows the laser diode beam to interact with the propagating wave at an instantaneous position of the wave in time. A pulsed beam may also be needed when using other modulators, for example, to give the cells of an LCD array time to change state, unless of course, the LCD cells are able to change state rapidly enough that, for example, a printed image is not adversely affected during the change.

One potential disadvantage of the acousto-optic modulator is that the repeat time of the laser pulses and so, for example, image print time, is limited by the time necessary for the acoustic wave to travel the length of the modulator, so that a new wave train defining new data to be recorded can fill the modulator. The LCD array does not suffer from these long acoustic propagation wait times, as the state of the cells can be changed in parallel.

A further example of a suitable modulator means for use in the present invention is an array of micromirrors extending in the low divergence axis of the beam, which may be actuated, for example, by an array of charge coupled devices. Each mirror in the array could reflect light in different directions depending on mirror orientation, so that in one orientation the reflected light would be focused onto the recording medium, whilst in another orientation the reflected light would be blocked off by suitable means. A disadvantage of micromirror arrays is that it is difficult to modulate beams from the array to have variable intensities. These arrays do however have greater contrast than LCD arrays, and the orientation of the micromirrors may be changed in parallel, so that there are no long acoustic propagation wait times as with the acousto-optic modulator.

Means are preferably provided for focusing the laser diode beam in its high divergence axis so that an image of the laser diode's stripe is formed at a selected position either a short distance in front of the light receiving face of the modulator means, or on the face of or within the modulator means. As said, the beam may be focused to a high resolution in the high divergence axis, but changes in this resolution may still be desirable, for example, to equalise the pixel size in both beam axes. By moving the focused image stripe from the middle (or face) of the modulator means to a position slightly in front of the face, the width of the image formed on the modulator means in the high divergence axis is increased, and so the resolution decreased. A further advantage of focusing the beam slightly in front of the modulator means is that the modulator means is saved from the full intensity of the beam, and the possibility of damage or burn out of the modulator means is reduced.

The beam is preferably not focused onto the modulator means in the low divergence axis. Rather, means are preferably provided to expand the beam in this axis so that it fully illuminates and substantially matches the length of the modulator means. Preferably, means are provided to collimate the laser diode beam in the low divergence axis, before the beam is expanded.

In view of the differing optical requirements in the two axes, the apparatus may comprise an anamorphic optical means for focusing the laser diode beam in the high divergence axis into, onto or just before the modulator means and for collimating the beam in the low divergence axis. The apparatus may also comprise means for anamorphically expanding the laser diode beam in the low divergence axis relative to, e.g. without affecting, the high divergence axis. This latter means may be, for example, an anamorphic cylindrical telescope system.

Downstream of the modulator means, the imaging means focuses the individually modulated beam portions onto the recording medium, and may also be arranged to magnify or demagnify the pixel images provided by the beam portions, as required, to a desired resolution. The modulator means may be arranged in a conjugate plane to that of the recording medium, so that both are in a focal plane of the imaging means, and, in this case, the modulator means is activated according to, for example, a desired print image. In an alternative embodiment, however, the modulator means is arranged to lie in a Fourier plane, so that the desired image is formed on the recording medium by activating the modulator means according to a Fourier transform of, for example, a desired print image. This may be advantageous, in that image data arriving at a printer may already be in the form of a Fourier transform, this being a standard method of data compression, and so the need for means to convert the Fourier transform to image data may be avoided. A transformed image also lends itself to various image-manipulation processes, and the optical transform of a pixellated pattern tends to look blurry rather than pixellated, and so will tend to produce a better quality image (i.e. less pixellated).

The array of beam portions may be scanned across the recording medium, such as a dyesheet, in a suitable manner e.g. in a direction perpendicular to the axis of the modulator means, so that several lines of pixel data are produced simultaneously.

The invention provides a particularly advantageous printing arrangement as the beam quality of a laser diode in the low divergence axis is effectively improved thereby allowing for high resolution and fast printing by a low-cost, reliable apparatus. At the same time, the invention utilizes the high beam quality in the other axis to advantage.

BRIEF DESCRIPTION OF THE DRAWINGS

Embodiments the present invention will now be described, by way of example only, with reference to the accompanying drawings, in which:

FIG. 1 is a schematic diagram of apparatus for the one dimensional division of a laser diode beam along its low divergence axis, when viewed in that axis;

FIG. 2 is a schematic diagram of the apparatus of FIG. 1 when viewed in the high divergence axis of the beam.

DETAILED DESCRIPTION OF THE PREFERRED EMBODIMENTS

Figure 1A:
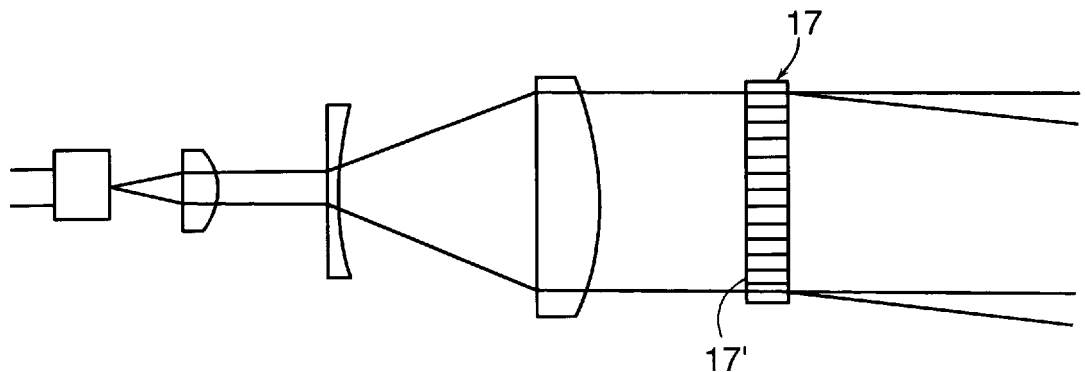
FIG. 1A is a schematic diagram of a portion of the apparatus depicted in FIG. 1 according to an alternative embodiment of the invention.

Referring to FIGS. 1 and 2, a laser diode 1 emits light from an elongate stripe surface area (not shown). The emitted beam 2 is of asymmetric quality, being of high divergence in the axis of the stripe's width and of low divergence in the axis of the stripe's length.

A lens 3 collimates the beam 2 in the low divergence axis and a cylindrical telescope 4 expands the beam 2 in that axis so that the beam fully illuminates the length of an acousto-optic modulator 5. In the high divergence axis of the beam 2, the lens 3 focuses the beam 2 to the middle of the acousto-optic modulator 5, whilst the cylindrical telescope 4 has no effect. The acousto-optic modulator 5 is operated in a so-called "schophoney model".

An amplitude modulated acousto-optic wavetrain is propagated along the length of the modulator 5, regions of which act as diffraction gratings to each produce a deflected beam portion 6 and a non-deflected beam portion 7, whose relative intensities are determined by the amplitude of the wavetrain at the various regions.

The deflected beam portions 6 are focused by a telecentric imaging lens 8 onto a dyesheet 9 so that each beam portion 6 heats a separate pixel area of the dyesheet 9 to cause dye to transfer from the heated areas to a receiver sheet 10 to form printed pixels. The undeflected beam portions 7 are imaged onto a zero-order stop 11.

By amplitude modulating the carrier wave train, the intensity of the deflected beam 6 may be varied so that a desired line pattern of printed pixels can be produced.

The resolution of the print in the direction of the low divergence beam axis is dependent upon the size of the deflected beam portions 6 in that axis and on any magnification/demagnification provided by the telecentric imaging lens 8. Therefore a higher print resolution can be achieved than if the laser diode beam 2 were merely imaged onto the dyesheet 9 without being divided. Also, the resolution may be easily adjusted by modifying the acoustic wave train to vary the lengths of the diffracting regions.

The beam division has no effect on the print resolution in the high divergence axis of the beam 2, which is determined by the size of the beam 2 in that axis when it falls onto the modulator 5 and by the demagnification of the telecentric imaging lens 8. Thus, the resolution may be varied in this axis by focusing the beam 2 in this axis slightly in front of the modulator 5, so that the beam width in the high divergence axis diverges after focusing and is slightly wider on reaching the modulator 5. It should be noted that, although FIG. 2 shows the beam 2 focused to the middle of the modulator 5 in the high divergence axis, this arrangement could cause the modulator 5 to be damaged by the intensity of the beam 2. In practice, therefore, the beam 2 will typically be focused slightly in front of the modulator 5.

Figure 3:
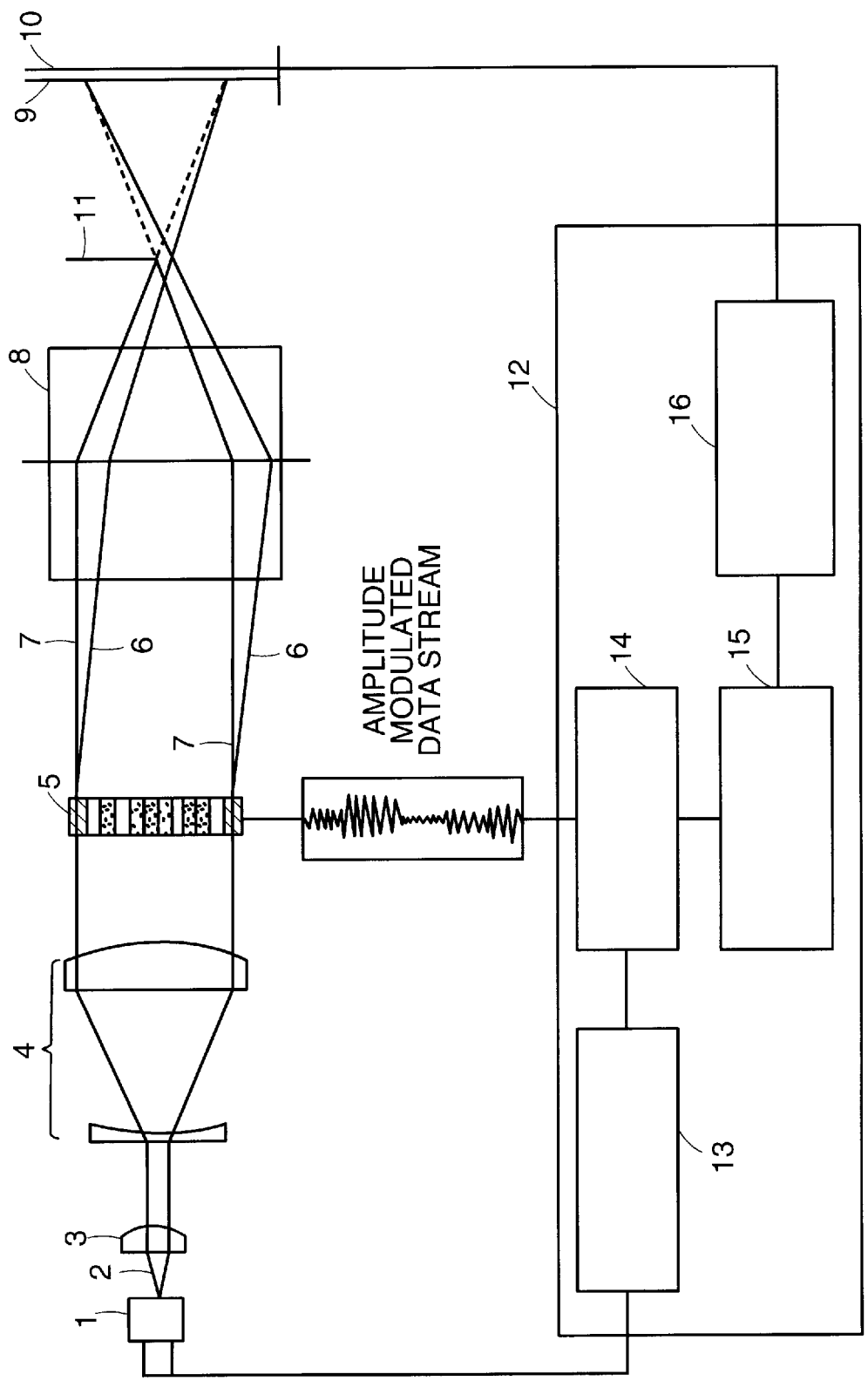
FIG. 3 is a schematic diagram showing the control means for the apparatus of FIGS. 1 and 2.

FIG. 3 shows the control of the print apparatus. A controller 12 comprises a laser pulse controller 13, a line data generator 14, a frame data generator 15, and a print transport controller 16.

Data regarding the desired print image is stored in the frame data generator 15, which supplies the data serially, pixel line by pixel line, to the line data generator 14, which then issues a control signal to the acousto-optic modulator 5 to propagate an amplitude modulated carrier wave train along the modulator's length. This wave train is modulated in accordance with the pixel data to have regions of high, low, and various intermediate amplitudes. The low amplitude regions correspond to a pixel-off condition and the intermediate and high amplitude modulated regions correspond to various degrees of pixel-on condition, with the higher the amplitude, the darker the pixel.

When the wave train with this data completely fills the modulator 5, the laser pulse controller 13 pulses the laser diode 1, so that it outputs a short pulse of light 2, whose duration is significantly shorter than the propagation time of the acoustic wave train in the modulator 5, so that the pulse only interacts with the wave train at an instantaneous wave position. The deflected beams 6 produced by this interaction are then imaged onto the dyesheet 9 to effect dye transfer to receiver sheet 10. This operation produces a single pixel line of print, and to produce a further line of print, the print transport controller 16 moves the dyesheet 9 and receiver sheet 10 along by a pixel line, whilst a new wave train with new pixel data is propagated along the modulator 5. The laser diode 2 is pulsed again when the carrier wave train fills the modulator 5 with the new pixel data. In this way, a desired print image may be built up line by line.

A suitable modulator 5 is a tellurium dioxide shear mode cell, which may typically have a length of 30 mm in the low divergence axis of the beam 2, a width of 1 to 4 mm in the high divergence axis of the beam 2, and a depth of about 10 mm in the optical axis (beam propagation direction). A carrier wave train may propagate along such a cell with a velocity of approximately 600 m/s, and typically will have a frequency of between 20 MHz and 100 MHz, depending on the wavelength of the laser diode—the carrier frequency is chosen to ensure maximum diffraction efficiency at the laser beam wavelength.

The pixel height is generally a minimum of 2 carrier wave train wavelengths, and so at, for example, 20 MHz the pixel height can be as small as 60 microns. This can give 500 pixels across a 30 mm cell, i.e. a line portion 500 pixels long may be printed by a single laser pulse. Typically, however, fewer pixels at lower resolution are used, and, in one embodiment, 60 pixels are fitted into the 30 mm cell at 0.5 mm per pixel.

The telecentric imaging lens 8 may typically demagnify the print pixel size from 0.5 mm to between 10 and 100 microns, so that the 60 pixels will cover a line length of between 0.6 and 6 mm. These print lengths will typically require 25 $\mu$J or 2.5 mJ of laser energy respectively. The former value corresponds to a peak laser power of about 50 W and an average power of about 0.5 W (i.e. a duty cycle of 1%). This power may be achieved, for example, by a Spectra Diode Labs SDL-3230-T diode array with emitting dimensions of 10 mm×1 micron. A laser pulse time of 0.5 microseconds would be acceptable, and the repetition rate must be slow enough to allow the acoustic wave train to propagate along the full length of the modulator 5, so that a pulse to pulse interval would need to be more than 50 microseconds, i.e. a repetition rate of slower than 20 kHz would be needed.

In the present apparatus, neighbouring pixels are written to the print medium in parallel, and so there will be a certain degree of thermal crosstalk between them. The controller 12 will need to compensate for this by governing the intensity of each beam 6 in dependence on the state of the pixels neighbouring the pixel to which the beam 6 is imaged.

Figure 1B:
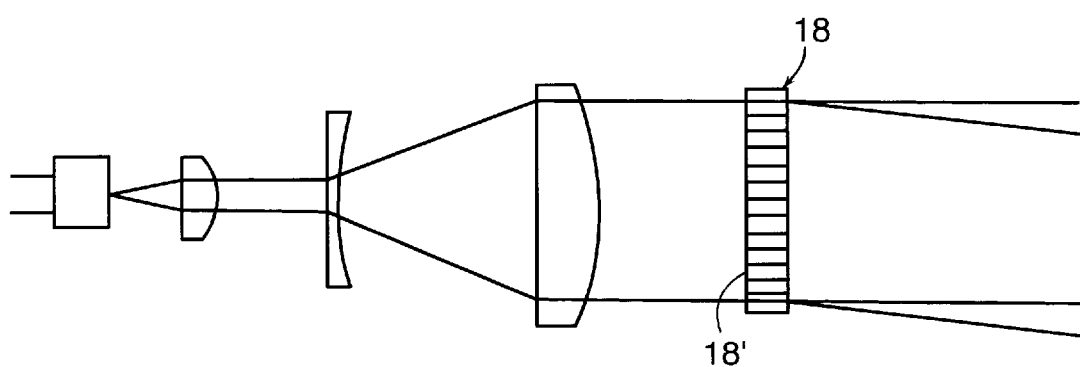
FIG. 1B is a schematic diagram of a portion of the apparatus depicted in FIG. 1 according to another alternative embodiment of the present invention.

The above is only one embodiment of the present invention, and many other modifications may be envisaged. For example, the undeflected beams 7 from the modulator 5 could be imaged onto the dyesheet 9, instead of the deflected beams 6. Also, other modulators, such as LCD array 17 of a single row of individual cells 17' as depicted in FIG. 1A or an array 18 of an individual micromirrors 18' as depicted in FIG. 1B could be used, and the modulator 5 could be positioned in a Fourier plane of the dyesheet 9 as depicted in FIG. 1. In this latter case, the amplitude modulation of the carrier wave train would need to be in response to data representing a Fourier transform of the desired image.

We claim:

1. Data recording apparatus comprising:
   a laser diode for emitting a light beam from an elongate stripe area thereof, the light beam comprising:
      a low divergence axis;
      a high divergence axis; and
      a cross-section having a plurality of different regions;
   modulator means arranged to modulate the light beam in solely one dimension parallel to the low divergence axis of the beam and for individually modulating the different regions of the beam cross-section along solely the low divergence axis to produce a plurality of individually modulated beam portions; and
   means for focusing the beam portions onto a recording medium to effect data recording.

2. The apparatus of claim 1, wherein the modulator means comprises a single row of LCD cells extending across the low divergence axis of the light beam, the cells being individually switchable to modulate intensities of the different regions of the light beam so that the cells produce the plurality of individually modulated beam portions.

3. The apparatus of claim 1, wherein the modulator means comprises an acousto-optic modulator extending across the low divergence axis of the light beam.

4. The apparatus of claim 3 further comprising a data generator for producing an acoustic wave train in the modulator, the wave train comprising wave train regions acting as diffraction gratings which each produce a deflected beam portion from a respective region of the light beam cross-section.

5. The apparatus of claim 4 further comprising a lens disposed between the modulator and the recording medium, wherein the deflected beam portions are focused onto the recording medium by the lens.

6. The apparatus of claim 4, wherein the acoustic wave train comprises an amplitude modulated carrier wave.

7. The apparatus of claim 4 further comprising a laser pulse controller for pulsing the light beam for a time which is short compared with a propagation speed of the acoustic wave train.

8. The apparatus of claim 1, wherein the modulator means comprises an array of micromirrors extending in the low divergence axis of the light beam.

9. The apparatus of claim 1, wherein means are provided for focusing the light beam in the high divergence axis so that an image is formed in front of a light receiving face of the modulator means.

10. The apparatus of claim 1 further comprising a telescope for expanding the light beam in the low divergence axis so that the expanded light beam illuminates a length of the modulator means.

11. The apparatus of claim 1, wherein the modulator means is arranged to lie in a Fourier plane, so that a desired image is formed on the recording medium by activating the modulator means according to a Fourier transform of the desired image.

12. Data recording apparatus comprising:
    a laser diode for emitting a light beam from an elongate stripe area thereof, the light beam comprising:
       a low divergence axis;
       a high divergence axis; and
       a cross-section having a plurality of different regions;
    modulator means for individually modulating the different regions of the beam cross-section along the low divergence axis of the beam to produce a plurality of individually modulated beam portions; and
    means for focusing each of the beam portions to a respective spot on a recording medium to effect data recording, each of the cross-sectional regions incorporating substantially a full width of the beam in the high divergence axis.

13. A data recording method comprising the steps of:
    emitting a light beam from a laser diode, wherein the light beam comprises:
       a low divergence axis; and
       a cross-section;
    modulating the light beam in a dimension parallel to the low divergence axis of the beam, such that different cross-sectional regions of the beam along the low divergence axis are individually modulated to provide respective beam portions; and
    focusing the respective beam portions onto a recording medium.

14. A method of dye thermal transfer printing comprising the steps of:
    emitting a light beam from a laser diode, wherein the light beam comprises:
       a low divergence axis;
       a high divergence axis; and
       a cross-section;
    heating selected regions of a dye donor element using the light beam; and
    transferring dye from the selected regions to a receiver element, wherein:
       different cross-sectional regions of the beam along the low divergence axis are individually modulated to provide respective beam portions which are focused at respective regions on the dye donor element; and
       each of the different cross-sectional regions of the beam incorporate substantially a full width of the beam in the high divergence axis.

* * * * *